3,819,619
N-ISOBORNYLOXYCARBONYLCEPHALOSPORIN C
Satoshi Horii, Takatsuki, Nariakira Mizokami, Suita,
 Masahiko Fujino, Takarazuka, and Susumu Shinagawa,
 Michihiko Ochiai, and Tetsuya Okutani, Suita, Japan,
 assignors to Takeda Chemical Industries, Ltd., Osaka,
 Japan
No Drawing. Filed Feb. 24, 1972, Ser. No. 229,169
 Claims priority, application Japan, Feb. 26, 1971,
 46/10,063, 46/10,137; Aug. 17, 1971, 46/62,417
Int. Cl. C07d 99/24
U.S. Cl. 260—243 C                    1 Claim

ABSTRACT OF THE DISCLOSURE

This invention relates to N-isobornyloxycarbonylcephalosporin C which is useful as an intermediate for the production of cephalosporin C and other cephalosporanic acid derivatives and is also useful as an antimicrobial agent.

---

The present invention relates to cephem compounds. More specifically, the present invention relates to N-isobornyloxycarbonylcephalosporin C and to a method for the production thereof.

The present inventors have unexpectedly found that N-isobornyloxycarbonylcephalosporin C is produced by reacting an aqueous solution containing cephalosporin C with isobornyloxycarbonyl chloride or an 1-isobornyloxycarbonylpyridinium chloride compounds; that the thus produced N-isobornyloxycarbonylcephalosporin C in the reaction mixture is recoverable in high yield from the reaction mixture; and that the protecting group i.e., the isobornyloxycarbonyl group, is easily removed by treating N-isobornyloxycarbonylcephalosporin C with an acid to recover cephalosporin C.

The present inventors have also found that the above produced N-isobornyloxycarbonylcephalosporin C is useful not only as an intermediate for the production of cephalosporin C and other cephalosporanic acid derivatives but also as an antimicrobial agent.

It has been found that when an aqueous solution containing cephalosporin C is reacted with an 1-isobornyloxycarbonylpyridinium chloride compound instead of isobornyloxycarbonyl chloride, the N-isobornyloxycarbonylation of cephalosporin C proceeds under milder conditions and with improved efficiency.

Cephalosporin C can be recovered from a solution containing cephalosporin C, for example an aqueous solution obtained from or present in a culture broth of cephalosporin C producing microorganisms.

A known method for recovering cephalosporin C comprises the steps of reacting cephalosporin C in an aqueous solution with sodium 2,4,6-trinitrobenzenesulfonate and recovering the resulting 2,4,6-trinitrophenylcephalosporin C. However, it is impossible to remove the group without incurring side reactions, e.g. the decomposition of the Δ3-cephem ring of the desired product.

It is an object of the present invention to provide a useful and novel compound, i.e., N-isobornyloxycarbonylcephalosporin C.

It is another object of the present invention to provide an industrially feasible method for the production of said compound.

A further object of the present invention is to provide a highly effective method for recovering cephalosporin C from its aqueous solution.

A further object of the present invention is to provide an advantageous method for producing 7-aminocephalosporanic acid from cephalosporin C through the formation of N-isobornyloxycarbonylcephalosporin C and N-isobornyloxycarbonylcephalosporin C ester, deacylation thereof and an ester cleavage reaction.

N-isobornyloxycarbonylcephalosporin C is produced by reacting cephalosporin C with isobornyloxycarbonyl chloride of an 1-isobornyloxycarbonylpyridinium chloride compound.

Referring to the latter compound, the pyridine ring of 1-isobornyloxycarbonylpyridinium chloride compound may be substituted by one or more of substituents which do not disturb the reaction and suitable isobornyloxycarbonylpyridinium chloride compounds include 1-isobornyloxycarbonyl-4-dimethylaminopyridinium chloride, 1-isobornyloxycarbonyl-4-amino-pyridinium chloride, and the like.

It is advantageous that the substituents of the 1-isobornyloxycarbonylpyridinium compounds are located in the 2- or 4-position of the pyridine ring and these are electron-donating groups such as amino, an alkylated amino (e.g. methylamino, ethylamino, dimethylamino), hydroxy groups, and the like.

The 1-isobornyloxycarbonylpyridinium chloride compound is superior to the isobornyloxycarbonyl chloride in that whereas isobornyloxycarbonyl chloride is sparingly soluble in water and reacts more readily in a mixture of water and an organic solvent such as acetone, dioxane or tetrahydrofuran than in an aqueous solution, the 1-isobornyloxycarbonylpyridinium chloride compounds on the other hand are water soluble and react very readily even in the absence of an organic solvent in the reaction system.

The 1-isobornyloxycarbonylpyridinium chloride compound is produced by reacting isobornyloxycarbonyl chloride with a corresponding pyridine compound according to *per se* known means for the production of quaternary pyridinium salts.

Each of the isobornyloxycarbonyl chloride and 1-isobornylcarbonylpyridinium chloride compounds may be either in the racemic form or in an optically active form.

Cephalosporin C may be employed in an aqueous solution thereof. Furthermore, the aqueous solution may be an aqueous solution obtained from a culture broth of cephalosporin C-producing microorganisms (e.g., a filtrate of the culture broth).

The culture broth can be prepared according to *per se* known methods.

The culture broth or its filtrate may contain, in large amounts, water-soluble impurities as well as fat-soluble impurities (e.g. cephalosporin N, cephalosporin P, antifoams, etc.). In this case, it is recommended that the aqueous solution should be prepared by subjecting the culture broth or its filtrate to conventional purification procedures such as chromatography, extraction by the use of an organic solvent (e.g. ethyl acetate, methyl ethyl ketone or the like).

Isobornyloxycarbonyl chloride may be added to the reaction system in the form of a solution in a water-miscible organic solvent which does not take part in the reaction. Such an organic solvent includes acetone, dioxane, tetrahydrofuran or the like.

The 1-isobornyloxycarbonylpyridinium chloride compound may be supplied to the reaction system in the form of an aqueous solution.

. The reaction is suitably carried out in a suitable solvent. Such a solvent includes water, an organic solvent, particularly a water-miscible solvent (e.g. acetone, dioxane, tetrahydrofuran, etc.) or a mixture of such an organic solvent and water.

Usually it is advantageous to carry out the recation at a pH value in a range from about 6.5 to 11; suitably from about 7 to 10, and most suitably from about 8 to 9.

As the pH adjusting agent, there may be employed an inorganic base, e.g. sodium hydrogen carbonate, sodium carbonate, sodium hydroxide, potassium hydroxide, lithium hydroxide, barium hydroxide or magnesium oxide, or an organic base, e.g. triethylamine, tributylamine, N-methylmorpholine or pyridine.

The reaction may be conducted at temperatures varying from a low temperature to room temperature or, under certain circumstances, even at elevated temperatures. However, the reaction is suitably carried out at a temperature ranging from about −5° C. to 50° C. and more suitably from about 0° C. to 35° C.

Under the above reaction conditions, the reaction is usually completed within a period of time ranging from about 10 minutes to about 4 hours.

The desired product, i.e. N-isobornyloxycarbonylcephalosporin C is recovered from the reaction mixture, for example, by acidifying the reaction mixture with a mineral acid (e.g. hydrochloric acid, sulfuric acid, etc.) to a low pH (suitably a pH of about 2 to 3) and then subjecting the resulting mixture to an extraction with an organic solvent which is not freely miscible with water such as an ether (e.g. diethylether), an alcohol (e.g. n-butanol), an ester (e.g. ethyl acetate), a ketone (e.g. methyl ethyl ketone) or a halogenated hydrocarbon (e.g. methylene chloride). On evaporation of the solvent from the extract, the desired product is obtained. When the concentration of N - isobornyloxycarbonylcephalosporin C is relatively high, N-isobornyloxycarbonylcephalosporin C may be recovered by precipitation of the compound from the reaction mixture by adjusting the aqueous reaction mixture to an acid pH and suitably a pH of about 1 to 3 with the mineral acid and collecting thus formed precipitates.

The thus obtained isobornyloxycarbonylcephalosporin C may further be purified, by a procedure which is routinely used for the purification of fat-soluble antibiotics and suitably by a procedure which is used for the purification of acidic fat-soluble antibiotics, for example, by the steps of extracting the active substance from the weakly acidified mixture with a suitable organic solvent, bringing the desired product into an aqueous phase under alkaline conditions (suitably at a pH of about 8 to 9) by means of extraction and bringing it again into an organic phase under acid conditions (suitably, a pH of about 1 to 3). Aside from those procedures, one may, of course, employ such techniques as countercurrent extraction, distribution, adsorption, ion exchange, molecular-sieve chromatography, etc. in suitable combinations to obtain a purified N-isobornyloxycarbonylcephalosporin C.

As mentioned above, a culture broth containing cephalosporin C may be employed as a solution containing cephalosporin C. However, culture broths containing cephalosporin C usually contain cephalosporin N as well. To remove cephalosporin N from such a mixture, one may take advantage of the phenomenon that cephalosporin N is decomposed in acid solutions according to *per se* known means as set out below.

For instance, before or after the reaction of such a solution with isobornyloxycarbonyl chloride or the 1-isobornyloxypyridinium chloride compounds, one may allow the solution to stand at a pH of about 3 and at about 37° C. for about 2 hours to decompose the cephalosporin N. As an alternative, one may take advantage of the fact that cephalosporin N alone is decomposed at the next step when trifluoroacetic acid, for example, is used to remove the isobornyloxycarbonyl group. Aside from those methods, one may of course separate isobornyloxycarbonylcephalosporin C from isobornyloxycarbonylcephalosporin N by such conventional techniques as chromatography, counter-current extraction and the like.

Cephalosporin C is recovered by treating the thus produced and collected N-isobornyloxycarbonylcephalosporin C with an acid.

The treatment with an acid is directed to the removal of the protecting group, i.e. isobornyloxycarbonyl, from N-isobornyloxycarbonylcephalosporin C.

The reaction mixture may be at a low pH suitably at a pH less than about 2.5, more suitably at a pH lower than about 2.0 and most suitably at a pH less than about 1.0.

It is most advantageous that trifluoroacetic acid or a mixture of trifluoroacetic acid and acetic acid is employed as the acid. When trifluoroacetic acid is employed, the amount of the acid relative to N-isobornyloxycarbonylcephalosporin C is usually in a range from about 10 to 100 moles per mole of N-isobornyloxycarbonylcephalosporin C.

Use may be made of a reaction solvent which does not disturb the reaction that is, the solvent is substantially unreactive. Such a solvent is exemplified by substances as acetic acid, dichloromethane, dichloroethane, chloroform, dioxane, tetrahydrofuran, ether, ethyl acetate, trifluoroacetic acid, and the like. It is preferable that the reaction is carried out in a mixture wherein the water content is less than about 30% (w./w.), and the use of anhydrous or substantially anhydrous trifluoroacetic acid or trifluoroacetic acid having advantageously a water content of less than about 10%.

The time and temperature of the reaction and the amount of the acid are selected with a view to ensuring a complete cleavage under the mildest possible conditions. For example, when anhydrous trifluoroacetic acid is employed, the optimum conditions are about 10° to 25° C. and about 10 to 30 minutes.

After the above reaction, the desired cephalosporin C is recovered from the reaction mixture by *per se* well known means such as concentration, countercurrent extraction, chromatography using a molecular-sieve or an ion exchange resin, and the like.

Thus, according to the method of the present invention, cephalosporin C in a crude solution can be easily recovered as pure cephalosporin C in high yield.

Those skilled in the art will readily understand modifications of the present method for the recovery of cephalosporin C, for example, by adding further *per se* conventional means to the above mentioned techniques, and it should be noted that those modifications fall within the scope of the present invention.

It is to be noted that according to the present invention 7-aminocephalosporanic acid may be produced from N-isobornyloxycarbonylcephalosporin C by esterifying N-isobornyloxycarbonylcephalosporin C to produce N-isobornyloxycarbonylcephalosporin C ester and subjecting the thus produced ester to a deacylation reaction and to an ester cleavage reaction.

For this purpose, N-isobornyloxycarbonylcephalosporin C is first subjected to an esterification reaction which is conventional *per se*. Preferably the ester is one which, after the deacylation reaction, can be cleaved to give rise again to a free carboxyl group under mild conditions. For example, the dibenzhydryl ester which can be obtained by a reaction with diphenyldiazomethane can be easily cleaved with, for example, trifluoroacetic acid and, as such, is useful in the practice of this reaction. Aside from the above ester, the ester obtainable by reacting with any one of the following agents can be easily cleaved by hydrolysis or alcoholysis and, as such, are of use in this reaction. The esters referred to above are those obtainable with, for example, silylating agents, e.g. trialkylhalogenosilane, triaralkylhalogenosilane, trialkoxyhalogenosilane, trialkylhalogenosilane, trialkoxyhalogenosilane, tetraalkyldiaryldisilazane, hexalkyldisilazane, hexaryldisilazane, etc.; silenating agents, e.g. dialkyldihalogenosilane, dialkoxydihalogenosilane, alkyltrihalogenosilane, alkoxytrihalogenosilane, diaralkyldihalogenosilane, hexalkylcyclotrisilazane, octalkylcyclotetrasilazane, octaralkylcyclotetrasilazane, etc.; bis(trialkyltin)oxide, N-trialkylstannyldialkylamine, trialkylstannylalkoxide, tri - n - alkyl(alkylthio)tin, etc. The alkyl group may be either straight-chain or branched, e.g. methyl, ethyl, n-propyl, i-propyl, n-butyl, s-butyl, t-butyl, i-butyl, n-pentyl, n-hexyl, dodecyl, decyl, etc.; cycloalkyl is exemplified by cyclohexyl, cyclopentyl, etc.; aralkyl is exemplified by benzyl, phenethyl, etc.; aryl is exemplified by phenyl, tolyl, p-chlorophenyl, etc.; alkoxy is exemplified by methoxy, ethoxy, propoxy, etc.

Referring to the deacylation reaction, N-isobornyloxycarbonylcephalosporin C ester prepared in the above manner is subjected to a deacylation reaction. In the first place, the aforesaid ester is reacted with a halogenating agent (e.g. $POCl_3$, $PCl_5$, etc.) to obtain the corresponding iminohalide compound. This reaction is desirably conducted in an anhydrous inert solvent, and it is also preferable to employ an acid acceptor which is able to neutralize the acid which is formed in the course of the reaction. For instance, it is desirable to use 1.1 moles of phosphorus pentachloride and 5 moles of pyridine per mole of the ester. This reaction may also be effected by adding the aforesaid halogenating agent to the esterification reaction system.

The reaction temperature is not critical, but to inhibit side reactions, this reaction is suitably carried out at a low temperature, for example, between about $-40°$ and $-10°$ C.

The resulting iminohalide compound is then reacted with an alcohol to produce the corresponding iminoether compound. The alcohol is ordinarily an aliphatic or aryl alcohol of up to 14 carbon atoms, exemplary alcohols including methanol, ethanol, propanol, amyl alcohol, butanol, benzyl alcohol, 2-phenylethanol, and the like. This reaction is preferably conducted in the presence of an acid acceptor such as, for example, a tertiary amine. For this purpose, one may add the required amount of acid acceptor in this reaction step or add an excess of the acceptor in the esterification or halogenation step. Like the immediately preceding reaction step, this reaction is also desirably conducted at a low temperature, for example at about $-20°$ to $0°$ C. The alcohol may be used in excess when it is also expected to cleave the silyl group. The resulting iminoether compound is then subjected to a hydrolysis reaction to produce 7-aminocephalosporanic acid ester. The reaction may be carried out under acidic or alkaline conditions. Thus, the reaction may be carried out in the presence of an inorganic acid (e.g. hydrochloric acid, sulfuric acid, phosphoric acid or the like), an organic acid (e.g. p-toluenesulfonic acid, trifluoroacetic acid, formic acid, or the like), a basic material (e.g. sodium bicarbonate, etc.) according to a *per se* known means as described for example in British Pat. No. 1,041,985.

Thus obtained 7-aminocephalosporanic acid ester is subjected to a *per se* known suitable ester cleavage reaction by the procedure described for example in British Pat. No. 1,041,985. The reaction is usually carried out by treating 7-aminocephalosporanic acid ester with trifluoroacetic acid, if desired, in an organic solvent (e.g. anisole, etc.), or by reducing 7-aminocephalosporanic acid ester according to a conventional means, for example, by use of palladium, platinum or a like catalyst. However, it is to be noted that when the ester group of the above mentioned iminohalide compound is a silyl ester group or a silenic ester group, such an ester group may be removed by use of a large amount of the alcohol in the above reaction step for the formation of said iminoether compound, or alternatively such an ester group may be removed in the hydrolysis reaction step to effect the deacylation reaction. The variations of such procedures also obviously falls within the scope of the present invention.

After the reaction, the desired 7-aminocephalosporanic acid is recovered by adjusting the pH of the reaction mixture to or substantially near the isoelectric point of 7-aminocephalosporanic acid.

The products obtained in the foregoing manner, i.e. N - isobornyloxycarbonylcephalosporin C and cephalosporin C, both have antimicrobial properties and are not only therapeutically useful but are also useful as intermediates in the manufacture of synthetic cephalosporins such as 7-aminocephalosporanic acid and other compounds. It need not be mentioned that 7-aminocephalosporanic acid, which can be derived from N-isobornyloxycarbonylcephalosporin C, is useful as a starting material for the production of synthetic cephalosporins. Though the above description has been made with particular reference to the acid forms, those compounds are capable of forming salts with such metals as sodium, potassium, calcium, aluminum, and the like, and with such organic bases as trimethylamine, triethylamine, tributylamine, triamylamine, pyridine and the like.

This invention will be further illustrated by way of Examples wherein the term "part(s) by weight" bears the same relationship to the term "part(s) by volume" as do "gram(s) to milliliter(s)."

The term "milliliter(s)" may be abbreviated as "ml."

REFERENCE EXAMPLE 1

Preparation of isobornyloxycarbonyl chloride

In 200 parts by volume of dry ether is dissolved 61.6 parts by weight of isoborneol and, under cooling with ice, a solution of 60 parts by weight of phosgene in 150 parts by volume of tetrahydrofuran is added dropwise. After the dropwise addition has been completed, the mixture is stirred at 50° C. for 2 hours. The solvent is distilled off and the viscous oily residue is subjected to thin-layer chromatography on silica gel using benzene as a solvent. The resulting chromatogram attests to a complete disappearance of the starting material isoborneol and the formation of a new product having a higher $R_f$ value. The IR absorption spectrum of this product shows that it is the desired chloroformate. (Yield 83.2 parts by weight (95.6%).)

REFERENCE EXAMPLE 2

In 50 parts by volume of dry methylene chloride is dissolved 2.44 parts by weight of 4-dimethylaminopyridine and, accompanied by stirring, a solution of 4.65 parts by weight of isobornyloxycarbonyl chloride in dry methylene chloride is added.

After stirring at room temperature for 30 minutes, dry ether is added to the mixture and the precipitate thus formed thereupon is then recovered by filtration. After washing with dry ether, the precipitate is reprecipitated from dry methylene chloride-dry ether, whereupon 6.1 parts by weight (yield 90%) of 1-isobornyloxycarbonyl-4-dimethylaminopyridinum chloride is obtained. M.P. 76°–77° C. (decomp.); IR spectrum: $\nu_{max}$ (KBr), 1780 cm.$^{-1}$, 1645 cm.$^{-1}$; UV spectrum: $\lambda_{max}$ ($H_2O$), 297 m$\mu$ ($\epsilon=$ 20,400).

EXAMPLE 1

Preparation of N-isobornyloxycarbonylcephalosporin C

Under cooling with ice, 0.4 part by weight of cephalosporin C sodium salt is dissolved in 0.87 parts by volume of a 1N aqueous solution of sodium hydroxide, followed by the addition of 5 parts by volume of water and 2 parts by volume of tetrahydrofuran. Then, 0.204 part by weight of isobornyloxycarbonyl chloride and a 1N aqueous solution of sodium hydroxide are added and, while the mixture is maintained under weakly alkaline conditions, i.e., a pH of about 8, the mixture is stirred at room temperature for 2.5 hours. After the reaction has been completed, the mixture is washed three times with 30 parts by volume of ethyl acetate. Under cooling with ice, the aqueous layer is adjusted to pH 3 with 1N hydrochloric acid and extracted three times with 50 parts by volume of ethyl acetate. The ethyl acetate layer is washed with a saturated aqueous solution of sodium chloride and dried over anhydrous sodium sulfate. The solvent is distilled off and the residue is reprecipitated from ethyl acetate-petroleum ether. The procedure yields 0.460 part by weight (88.6%) of the desired product as a white powder. M.P. 118°–120° C. Thin-layer chromatography (on silica gel); ethyl acetate: methanol (2.3), $R_f$ 0.42. Ultraviolet absorption spectrum (methanol): 262 mμ (ε=7500). Infrared absorption spectrum (KBr) cm.⁻¹: 1790, 1720.

Elemental analysis: for $C_{27}H_{37}O_{10}N_3S$ (percent): C, 54.44 H, 6.26: N, 7.06; Found (percent): C, 54.45: H, 6.42; N, 6.64.

EXAMPLE 2

A culture filtrate containing 1,500υ/ml. of cephalosporin C (20,000 parts by volume) is extracted with ethyl acetate (3 times with ⅓ volume) to remove the fat-soluble impurities and the aqueous layer is adjusted to pH 8.5 with an aqueous solution of sodium hydroxide. Accompanied by stirring 30 parts by weight of isoboronyloxycarbonyl chloride is added and while the reaction mixture is maintained at about 8.5 with a solution of sodium hydroxide, the reaction is allowed to proceed at room temperature for about 2 hours. After the reaction, the reaction mixture is made acidic (pH 2) with hydrochloric acid and extracted three times with 5000 parts by volume of ethyl acetate. The resulting ethyl acetate extract is further extracted with 0.2M phosphate buffer (pH 8). The aqueous layer is adjusted to pH 3 and the isobornyloxycarbonylcephalosporin C is brought again into ethyl acetate.

The ethyl acetate solution thus obtained is washed with water, dried and concentrated under reduced pressure. Finally, petroleum ether is added to the concentrate, whereupon 56.6 parts by weight of crude isobornyloxycarbonylcephalosporin C is obtained.

EXAMPLE 3

In 50 parts of volume of water is dissolved 9.4 parts by weight of a crude preparation containing 45% (w./v.) of cephalosporin C and, under cooling with ice, the solution is adjusted to pH 8-9 with 1N sodium hydroxide. To this solution is added a solution of 4.0 parts by weight of isobornyloxycarbonyl chloride in tetrahydrofuran. While stirring, the mixture is allowed to react at room temperature for 2 hours, the pH of the reaction mixture being maintained at pH 8 to 9 with 1N sodium hydroxide. The reaction mixture is washed with ethyl ether and the aqueous layer is made acidic with 1N hydrochloric acid. The resulting precipitate is extracted with ethyl acetate and, in the manner described in Example 2, an extraction is carried out with a 0.2M phosphate buffer. The final ethyl acetate extract is concentrated, followed by the addition of petroleum ether. The procedure yields 4.8 parts by weight of crude isobornyloxycarbonylcephalosporin C.

The thin layer chromatogram (TLC) of the above product (silica gel; solvent system: ethyl acetate:methanol=2:3) reveals a spot of isobornyloxycarbonylcephalosporin C at $R_f$ 0.42 and a faint spot at $R_f$ 0.18.

To obtain a pure preparation of isobornyloxycarbonylcephalosporin C, the above product is further purified by chromatography on silica gel (solvent system: methanol: ethyl acetate in a ratio of 3:2) to obtain the same product as in Example 1. Antibacterial activity of the product (minimal inhibitory concentration; assay organism: *Bacillus subtilis*) 12.5γ/ml.

EXAMPLE 4

In 50 parts by volume of anisole is dissolved 10 parts by weight of the N-isobornyloxycarbonylcephalosporin C obtained in Example 3 and, under substantially anhydrous conditions and at −20° C., 100 parts by volume of trifluoroacetic acid is added. The mixture is further stirred at −20° C. for 5 minutes and at room temperature for 20 minutes. Then, the mixture is neutralized with triethylamine to pH 6, followed by the addition of water. The resulting aqueous solution is purified by chromatography on a strongly basic anion exchange resin, e.g. Dowex 1 (manufactured and sold by the Dow Chemical Co., Midland, Mich., U.S.A.) by washing with water, eluting with 0.2M ammonium acetate buffer, pH 5.8 and, then, to chromatography on activated carbon. Fractions containing cephalosporin C are collected and adjusted to pH 6.5 with N-NaOH, followed by the addition of methanol to yield crystals. The procedure yields 4.7 parts by weight of crystals of cephalosporin C sodium salt.

EXAMPLE 5

In 2 parts by volume of anisole is dissolved 1.1 parts by weight of N-isobornyloxycarbonylcephalosporin C and, at −20° C., 7 parts by volume of trifluoroacetic acid is added. Under substantially anhydrous conditions, the mixture is stirred at the aforesaid temperature for 5 minutes and at room temperature for 30 minutes. Anhydrous ethyl ether is then added. The resulting precipitate is recovered by filtration, washed well with dry ethyl ether and allowed to stand overnight, under reduced pressure, in a desiccator containing potassium hydroxide and phosphoric anhydride. The resulting powder is dissolved in water and the solution is adjusted to pH 6.5 with 1 N sodium hydroxide, followed by the addition of ethanol. The procedure yields 0.5 parts by weight of crystals of cephalosporin C sodium salt (60%).

EXAMPLE 6

In 10 parts by volume of methanol is dissolved 1.0 part by weight of N-isobornyloxycarbonylcephalosporin C and, under cooling with ice, 1.1 parts by weight of diphenyldiazomethane is added. The mixture is stirred under cooling with ice for 30 minutes and, then, at room temperature for 3 hours, after which time the methanol is distilled off under reduced pressure.

The residue is dissolved in 150 parts by volume of ethyl acetate and the ethyl acetate layer is washed with 0.5 N sodium hydrogen carbonate and with water. The ethyl acetate layer is dehydrated, and the solvent is distilled off. The residue is purified by chromatography on silica gel (solvent system; ether:chloroform=1:1), whereupon 1.5 parts by weight (90%) of isobornyloxycarbonylcephalosporin C dibenzhydryl ester is obtained. M.P. 98–99° C.; elemental analysis: calculated for $C_{53}H_{57}O_{10}N_3S$: C, 68.59; H, 6.19; N, 4.53; S, 3.45; found: C, 68.97; H, 6.37; N, 4.23; S, 3.40. Ultraviolet absorption spectrum (in methanol): $\lambda_{max}$. 260 mμ (ε=8,100). Infrared absorption spectrum (KBr): characteristic absorptions at 1790, 1750 and 1730 cm.⁻¹. Thin-layer chromatography (silica gel; ethyl acetate-chloroform=1:4): $R_f$ 0.42.

In 30 parts by volume of anhydrous methylene chloride is dissolved 1.0 part by weight of the dibenzhydryl ester obtained above and, while cooling at −15° to −20° C., 0.5 part by volume of anhydrous pyridine and 10 parts by volume of a solution of 0.7 part by weight phosphorus pentachloride in anhydrous methylene chloride are added dropwise in the order mentioned. While cooling, the mixture is reacted for 1 hour. After the addition of 7 parts by volume of anhydrous methanol, the mixture is stirred at −15° to −20° C. for 40 minutes and at room temperature for 1 hour, after which time 11 parts by volume of 2 N hydrochloric acid is added, and stirred for 45 minutes. After adjusting the pH of the mixture to 7.9 with 1N-NaOH, the methylene chloride layer is separated. The aqueous layer is further extracted with methylene chloride. The two extracts are combined and the solvent is distilled off under reduced pressure. The residue is dissolved in 5 parts by volume of anisole and, in the absence of moisture and under cooling (−20° C.), 14 parts by volume of trifluoroacetic acid is added. The reaction is conducted, while cooling, for 5 minutes and at room temperature for 20 minutes. After the reaction mixture is neutralized (pH 6) with triethylamine, water is added. The mixture is passed through a column of a strong anion exchange resin, e.g. Dowex 1×2 (in the form of the acetate which is manufactured and sold by the Dow Chemical Co., Midland, Mich., U.S.A.). After the column is washed with water, the adsorbed 7-aminocephalosporanic acid is eluted with 0.5 N acetic acid. The eluate is lyophilized. There is obtained a yield of 0.205 part by weight (70%).

EXAMPLE 7

In 30 parts by volume of methylene chloride is suspended 2.79 parts by weight of the crude N-isobornyloxycarbonylcephalosporin C obtained in Example 3, followed by the addition of 1.8 parts by volume of pyridine. While cooling with ice, 0.67 part by weight of dimethoxydichlorosilane is added. The mixture is stirred for 30 minutes. The reaction mixture which has now become clear is cooled to −40° C. and a solution of 1.71 parts by weight of phosphorus pentachloride in 25 parts by weight of methylene chloride is added dropwise over an 8 minute period. Then, the temperature is gradually elevated and, at −15° to 20° C., the mixture is stirred for 2 hours. The thin layer chromatogram of the reaction product attests to the disappearance of the starting material and the emergence of a spot corresponding to a new chlorination product. The reaction mixture is chilled again to −40° C. and 10 parts by volume of methyl alcohol is added. The temperature is gradually elevated and, at −20° to −15° C., the mixture is stirred for 2.5 hours, followed by the addition of 1.2 parts by volume of pyridine and, then, 6 parts by volume of pure water. The mixture is stirred at −20° to 0° C. for 15 minutes and at 0° to 5° C. for 15 minutes. The insoluble materials which separate from the reaction mixture are filtered off and the aqueous layer is separated, washed with ether and adjusted to pH 3.5 with a saturated aqueous solution of sodium hydrogen carbonate, whereupon colorless crystals of 7-aminocephalosporanic acid are obtained. The crystals are recovered by filtration, washed twice with cold water and dried. Using this procedure, 7-aminocephalosporanic acid is obtained in high yield. As determined by melting point measurement, thin layer chromatography and infrared spectro-photometry, this product is identical with an authentic sample of 7-aminocephalosporanic acid.

EXAMPLE 8

In 14 parts by volume of methylene chloride is suspended 1.37 parts by weight of the crude N-isobornyloxycarbonylcephalosporin C prepared in Example 3 and, at room temperature, 9.54 parts by weight of triethylamine and 0.46 part by weight of dimethyldichlorosilane are added. The mixture is stirred for 30 minutes. To the clear solution thus obtained is added 0.6 part by weight of pyridine, and at −30° C., a solution of 0.57 part by weight of phosphorus pentachloride in 10 parts by volume of methylene chloride is added dropwise over 10 minutes. The mixture is stirred at −30° to −15° C. for 2 hours. Then, the mixture is cooled again to −30° C. and 5 parts by volume of methanol is added. The mixture is stirred at −20° to −15° C. for 2 hours. At −20° C., 0.4 part by volume of pyridine and 4 parts by volume of pure water are added. Then, the temperature is gradually elevated and, at 5° C., the mixture is stirred for 40 minutes. The aqueous layer is separated and adjusted to a pH of 3.5 with a saturated aqueous solution of sodium hydrogen carbonate, whereupon crystals separate out. The crystals are recovered by filtration, washed with cold water and dried. In the above manner, 7-aminocephalosporanic acid is obtained in good yield. Based on its infrared and other identification data, this product is identical with an authentic sample of 7-aminocephalosporanic acid.

EXAMPLE 9

A culture broth containing cephalosporin C is adjusted to a pH of 5.5 and the mycelia are removed by filtration. A 2000 parts by volume portion of the resulting culture filtrate is adjusted to a pH of 7.5 and, then, passed through a column packed with 200 parts by volume of an anion exchange resin e.g. Amberlite IRC–50 (H-form) manufactured and sold by Rohm and Haas, U.S.A., whereby basic impurities are removed. The effluent is adjusted to a pH of 3 and allowed to stand at 37° C. for 2 hours, after which it is adjusted to a pH of 8.5 with a solution of sodium hydroxide. To this solution is added 50 parts by weight of 1-isobornyloxycarbonyl-4-dimethylaminopyridinium chloride and, at room temperature, the reaction is allowed to proceed for about 1.5 hours, the pH of the solution being controlled at a pH of 8.0 to 8.5.

After the reaction is completed, the mixture is made acidic (pH 2) with hydrochloric acid and, then, extracted three times with 500 parts by volume portions of ethyl acetate. The resulting ethyl acetate solution is extracted with 0.2M phosphate buffer (pH 8). The aqueous layer is adjusted again to pH 2 and the N-isobornyloxycarbonylcephalosporin C is brought into ethyl acetate. The ethyl acetate solution thus obtained is washed with a saturated aqueous solution of sodium chloride and, then, dried over anhydrous sodium sulfate. The solvent is distilled off under reduced pressure and petroleum ether is added to the residue, whereupon 11.4 parts by weight of crude N-isobornyloxycarbonylcephalosporin C is obtained.

The purity of this crude product is about 66% as measured by a bioassay method with *Bacillus subtilis* as an assay organism.

The above crude product is chromatographed on acid-treated silica gel using chloroform and ethyl acetate (1:1) as a solvent system, whereupon 3.4 parts by weight of pure N-isobornyloxycarbonylcephalosporin C is obtained. The biological and physico-chemical properties of this product are in complete agreement with those of the N-isobornyloxycarbonylcephalosporin C synthesized by the procedure of Example 3.

EXAMPLE 10

In 25 parts by volume of water is dissolved 4.73 parts by weight of crystalline cephalosporin C sodium salt, followed by the addition of 10 parts by volume 1N-sodium hydrogen carbonate and, then, 4.0 parts by weight of 1-isobornyloxycarbonyl - 4 - dimethylaminopyridinium chloride. Accompanied by stirring, the mixture is allowed to react at room temperature for 1.5 hour.

After the reaction is completed, the mixture is adjusted to a pH of 2 with 2N hydrochloric acid and, then, extracted with ethyl acetate. The ethyl acetate layer is washed with water, dried over anhydrous sodium sulfate and concentrated under reduced pressure.

To the concentrate is added petroleum ether, whereupon 5.1 parts by weight of the desired compound N-isobornyloxycarbonylcephalosporin C is obtained (yield 85.6%). Thin layer chromatography, ultraviolet absorption spectrum, and infrared absorption spectrum show the product to be identical with the product of Example 1. Antibacterial potency (minimal inhibitory concentration) of the product 12.5γ/ml. against *Bacillus subtilis*.

EXAMPLE 11

A culture broth (2,000 parts by volume) containing cephalosporin C is passed through a column of an anion exchange resin e.g. Amberlite IRC–50 (H-form) manufactured and sold by Rohm and Haas, U.S.A., and 35 parts by weight of 1-isobornyloxycarbonyl-4-aminopyridinium chloride is added to the effluent. The mixture is stirred at room temperature for 1.5 hours, the pH of the mixture being maintained within the range of 8.0 to 8.5. The resulting reaction mixture is brought to a pH of 2 with 2N hydrochloric acid and, then, extracted with ethyl acetate. The ethyl acetate layer is washed with water and extracted with 0.2M phosphate buffer (pH 8.0). The aqueous layer is adjusted again to a pH of 2 and extracted with ethyl acetate. The ethyl acetate layer is washed with a saturated aqueous solution of sodium chloride and dried over anhydrous sodium sulfate, followed by the removal of ethyl acetate by distillation. Petroleum ether is then added to the residue, whereupon 6.9 parts by weight of crude N-isobornyloxycarbonylcephalosporin C is obtained.

As measured by a bioassay method using *Bacillus sub-*

EXAMPLE 12

10.2 Parts by weight of N-isobornyloxycarbonylcephalosporin C is added to a mixture of 700 parts by volume dried methylene chloride and 6.4 parts by volume of dried pyridine, followed by the addition of 12.3 parts by volume of trimethylchlorosilane. The resulting mixture is stirred at room temperature for 1 hour. After the reaction, the reaction mixture is cooled at −20° C., and to the reaction mixture is added 21.7 parts by volume of pyridine and 14.2 parts by weight of phosphorus pentachloride dissolved in 500 parts by volume of dried methylene chloride. The resulting mixture is stirred at −12° C. for 45 minutes, and after the addition of 250 parts by volume of dry methanol at −10° C., the stirring is further continued at −10° C. for 30 minutes and at 25° C. for 30 minutes. To the reaction mixture is added 40 parts by volume of a 25% (w./v.) formic acid, and the resulting mixture is adjusted to a pH of 2.0 by the addition of triethylamine. The resulting mixture is stirred for 45 minutes. The pH of the reaction mixture is then adjusted to 3.5 by the addition of triethylamine, and the resulting mixture is kept standing at 0° C. resulting in the formation of precipitates. The precipitates are collected by filtration, washed with methylene chloride, methanol, and ether in this order, and dried to obtain 3.6 parts by weight of 7-aminocephalosporanic acid. The yield is 77.3%.

What is claimed is:
1. N-isobornyloxycarbonylcephalosporin C.

References Cited
UNITED STATES PATENTS 3,167,550    1/1965    Chow et al. _____ 260—243 C DONALD G. DAUS, Primary Examiner R. D. McCLOUD, Assistant Examiner U.S. Cl. X.R.

260—242, 295 F, 479 S; 424—246